June 14, 1932. M. TOMODA 1,862,613
SPLIT CORE CURRENT TRANSFORMER
Filed Dec. 29, 1931
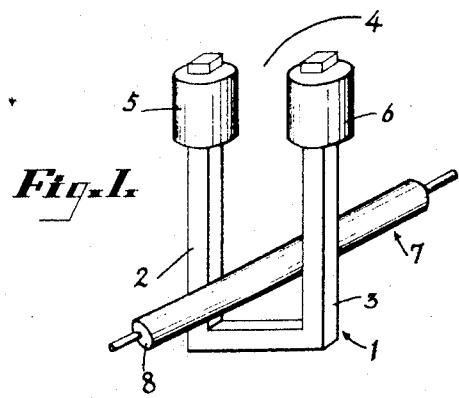
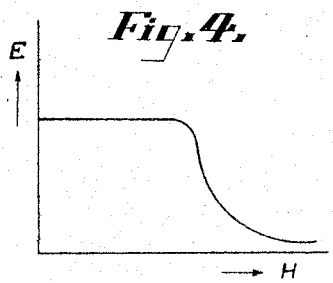
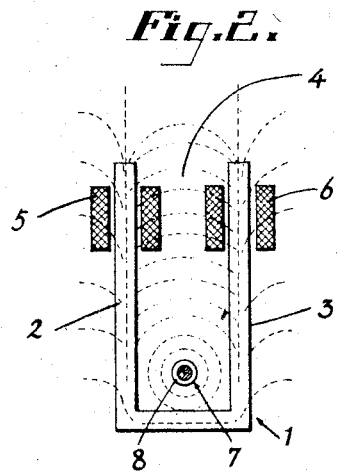
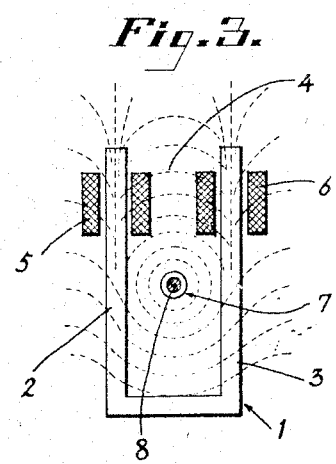
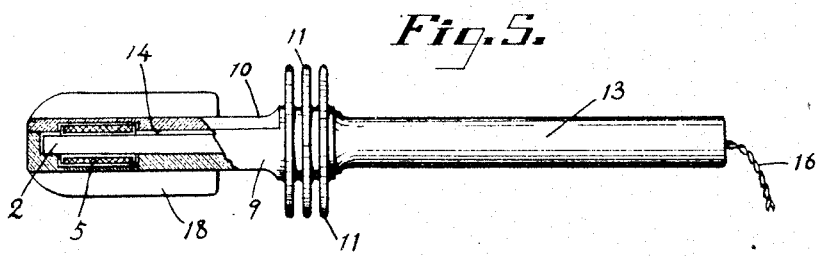
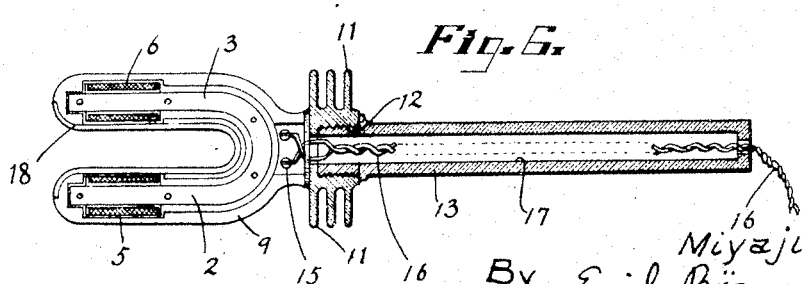
Inventor:
Miyaji Tomoda
By Emil Bönnelycke
Attorney Patented June 14, 1932

1,862,613

UNITED STATES PATENT OFFICE

MIYAJI TOMODA, OF KICHISHOJI, JAPAN, ASSIGNOR TO KABUSHIKI KAISHA YOKOGAWA DENKI SEISAKUSHO, OF SHIBUYA-MACHI, TOKYO, JAPAN

SPLIT CORE CURRENT TRANSFORMER

Application filed December 29, 1931, Serial No. 583,771, and in Japan July 8, 1931.

This invention relates to improvements in a split core current transformer and it has a particular relation to an apparatus for measuring alternating current in a bus-bar, a distribution line or other conductors.

One object of the invention is to provide a split core current transformer in which the inaccuracy of measurement resulting from an indefinite air-gap in the magnetic circuit is effectively obviated.

Another object is to provide a transformer of this sort, in which the construction is exceedingly simple and in which it requires no manipulation of any parts of apparatus in order to introduce within it a conductor carrying the alternating current to be measured.

A further object of the invention is directed to a novel construction which renders the induced electromotive force in the secondary winding practically constant irrespectively of the position of the said conductor with respect to the winding, or of the thickness of insulation provided on the conductor.

Heretofore, a transformer of this sort has been restricted to the type having substantially a closed magnetic circuit, and the iron core was sometimes formed in scissor-like shape, comprising a closeable mechanism for the introduction of an electric conductor into and the withdrawal thereof out of the magnetic circuit.

In this type of the apparatus, however, errors are liable to occur owing to an indefinite air-gap which is inevitably formed around the closeable mechanism. Not only that, its manipulation is troublesome and often dangerous whenever the measurement of high-voltage currents is involved.

In the current transformer according to the present invention, instead of trying to minimize the air-gap, it is made widely open. The presence of a large constant air-gap in the magnetic circuit not only entirely eliminates any indefiniteness, but it also allows the free passage of a conductor therethrough for the measurement of the current flowing in it. In a preferred embodiment of the invention, the iron core is made in U-shape or tuning-fork like form, and a pair of induction or secondary windings are disposed on the legs of the core, adjacently to the free ends thereof. The length of these legs being sufficiently great, the amount of the flux interlinking with the windings, or the induced electromotive force, is substantially constant regardless of the position of the conductor under measurement.

For a better understanding of the present invention, reference may now be had to the accompanying drawing forming a part of this specification, of which:

Fig. 1 is a perspective view showing diagramatically the relative position between the current transformer according to my invention and a conductor carrying an alternating current to be measured, the conductor assuming the normal lowered position for the measurement.

Fig. 2 shows the same in elevation, partly in a vertical section, illustrating at the same time the distributions of the magnetic flux due to the current in the conductor.

Fig. 3 is a similar view, when the conductor is situated at a somewhat raised position.

Fig. 4 is a diagram showing a curve of the induced electromotive force in the secondary windings as a function of the distance of the conductor from the bottom of the iron core.

Fig. 5 is a side elevation, partly in section, of a practical embodiment of my invention.

Fig. 6 is a plan thereof with the cover of the casing removed and the remaining part in horizontal section.

Referring to the drawing, 1 is a U-shaped iron core comprising a pair of legs 2 and 3 and forming a full-widthed air-gap at the top thereof. 5 and 6 are the secondary or induction windings provided near the free ends of the respective legs. 7 is a conductor carrying the alternating current to be measured, eventually with an insulating covering 8. As will be clearly seen in the drawing, the air-gap 4 is substantially of the same width as the distance between the two legs, so that the conductor 7 can freely be introduced therethrough.

The legs 2 and 3 being sufficiently long and the secondary windings 5 and 6 being provided near the free ends of the legs, the amount of magnetic flux interlinking with the secondary windings, or the electromotive force E induced therein, is practically independent of the position of the conductor as measured by the height H from the bottom portion of the core. This is due to the fact that the magnetic reluctance of the iron core being practically negligible in comparison with that of the air, the magnetomotive force of the alternating current in the conductor 7 is not consumed to any appreciable degree in the iron, but mainly in the air-gap. This fact results to the invariable distribution of the lines of magnetic force in the air-gap surrounding the windings, regardless of the position of the conductor. This state of affairs is clearly illustrated in Figs. 2 and 3 by means of dotted lines. In this wise, an alternating current passing through the conductor can be measured accurately by merely inserting the same through the air-gap 4, and the result of measurement will be practically the same irrespective of the position of the conductor.

The windings 5 and 6, of course, are to be connected to an alternating current voltmeter by suitable lead wires. Since the electromotive force induced in the windings is necessarily small, the voltmeter has to be sensitive. For this purpose I prefer to employ a rectifier type ammeter comprising a rectifying element composed of cuprous oxide.

In Figs. 5 and 6 is shown a more practical form of the apparatus according to my invention, in which 9 is a casing made of insulating material such as bakelite. The assembly comprising a U-shaped core 3 and a pair of induction windings 5, 6 is accommodated in the casing, which is closed by a cover 10. Integral with the casing 9 is a plurality of discs 11 which serves to increase the leakage pass for high tension currents. The bore of this latter portion is internally threaded, as at 12, to which a handle 13 may be securely connected. The handle 13 is replaceable with a longer or a shorter one according to the circumstances. The two windings 5 and 6 are connected in series through a suitable clearance space such as one 14 below the cover, and the ends of the windings are brought to the terminals 15, from which the lead wires 16 may be led through the central channel 17 formed in the body of the handle, eventually to be connected to a suitable voltmeter. 18 is a shield provided on the inside wall of the casing, with a view to preventing the arcing over of high tension currents to the iron core 3 through the screws securing the cover 10.

What I claim is:—

1. A split core current transformer, comprising an iron core of U-shape, between the free ends of the legs of which a wide air-gap is permanently formed, and an induction winding provided near the free end of a leg of the iron core, the said winding being entirely concentrated near the said free end of the leg and the said air-gap being wide enough to allow the introduction of a conductor, the current flowing through which is to be measured.

2. A split core current transformer, comprising an iron core of U-shape, between the free ends of the legs of which a wide air-gap is permanently formed, and an induction winding provided near the free end of each of the legs of the iron core, the said windings being entirely concentrated near the respective free ends of the legs and the said air-gap being wide enough to allow the introduction of a conductor, the current flowing through which is to be measured.

3. A split core current transformer, comprising an iron core of U-shape, between the free ends of the legs of which a wide air-gap is permanently formed, an induction winding provided near the free end of each of the legs of the iron core, a U-shaped casing made of insulating material accommodating the said core and windings, and a handle detachably secured to the said casing, the said windings being entirely concentrated near the respective free ends of the legs and the air-gap left between the legs of the casing being wide enough to allow free introduction of a conductor, the current flowing through which is to be measured.

In testimony whereof I affix my signature.

MIYAJI TOMODA.